Figures 1, 2, 3, 4, 5:
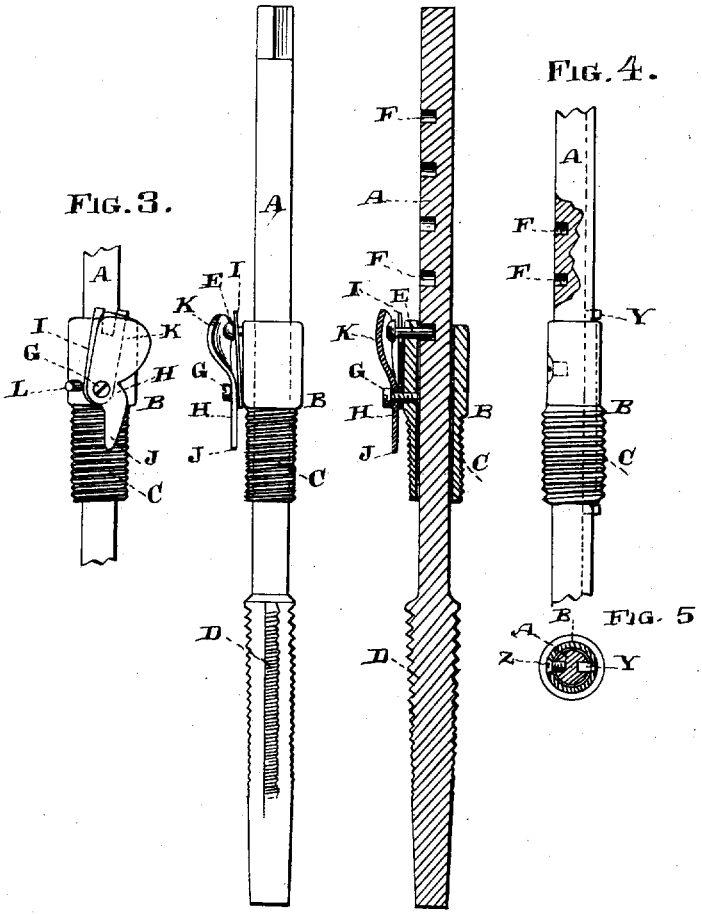

J. C. STEBER.

Assignor to C. V. MANNER.

SCREW TAP.

No. 10,646. Reissued Sept. 22, 1885.

Witnesses,
J. H. Squire.
H. C. Lee.

Inventor,
Jos. C. Steber
By Dewey & Co
attorneys

N. PETERS. Photo-Lithographer, Washington, D. C.

UNITED STATES PATENT OFFICE.

JOSEPH C. STEBER, OF SAN FRANCISCO, CALIFORNIA, ASSIGNOR TO CHARLES V. MANNER, OF SAME PLACE.

SCREW-TAP.

SPECIFICATION forming part of Reissued Letters Patent No. 10,646, dated September 22, 1885.

Original No. 284,510, dated September 4, 1883. Application for reissue filed August 27, 1885.

*To all whom it may concern:*

Be it known that I, JOSEPH C. STEBER, a citizen of the United States, residing at San Francisco, in the county of San Francisco and State of California, have invented certain new and useful Improvements in Stay-Bolt Taps for Boiler-Makers, of which the following is a specification.

This invention relates to that class of bolt-taps which are used by boiler-makers for the purpose of threading holes in boilers for the reception of stay-bolts.

In the drawings which are hereunto annexed, and which form a part of this specification, Figure 1 is a side elevation of my improved stay-bolt tap. Fig. 2 is a central longitudinal section. Fig. 3 is a top view of the threaded sleeve. Fig. 4 is a side view illustrating a modification of the threaded sleeve, and Fig. 5 is a sectional plan view of the same.

Similar letters of reference are used to indicate like parts throughout the several views.

A represents the stem of the reamer or tap, upon which is placed the sleeve B. The sleeve is bored smooth, and is adapted to be freely moved up and down upon the stem A, and the lower portion thereof is provided with a screw-thread, C, which is of the same diameter as the threaded bolt-hole cut by the reamer D. The upper part of the sleeve is made thicker or of greater diameter than the threaded portion, and it is pierced at its upper end for the reception of the headed pin or bolt E, which enters one of a series of holes, F, formed in the tap-stem.

At a point about midway of the length of the sleeve I pivot, by means of the screw-bolt G, the swinging arm H. The said bolt G also holds in place the spring-plate I, which is slotted at its upper or outer end, so as to embrace the pin E.

It should here be remarked that the lower end, J, of the pivoted arm H is to be somewhat pointed and rounded off, and that the upper end, K, is made beveled or concave in the direction of its width, the lowest point or edge being on a diametrical line with the inner end or point J. The object in thus constructing the lever-arm will be more fully described hereinafter.

A small stop or pin, L, placed at one side of the arm H, prevents the arm from being turned so as to uncover the head of the pin E, and a small lug may be formed on the under side of the lowest edge of the lever end K, which will prevent said arm from being moved over and beyond the pin E after said pin has been forced home into the hole F.

In the modification shown in Figs. 4 and 5 I dispense with the tripping mechanism hereinbefore described, and make the upper portion of the sleeve B of less diameter than the screw-threaded portion C, and set the said sleeve at the proper distance from the tap by means of a small screw, Z, which enters the holes F in the tap-stem A. Rotation of the stem within the sleeve is prevented by the key or gib Y, which enters a keyway cut lengthwise in the stem A and firmly keys or binds the two together, and for every turn the tap makes in the lower plate the sleeve will also make one in the upper plate.

For the purpose of withdrawing the tool it will be easier to screw the sleeve on through the lower plate, and thus remove all burrs or chips left by the tap or reamer.

The operation of my improved stay-bolt tap will be as follows, to wit: The sleeve B is placed on the stem A at such a distance from the threaded end thereof as will permit of the partial entrance of the tap into the lower bolt-hole before the threads of the sleeve B engage with the threads of the upper bolt-hole, and the said sleeve is held in this position by the pin E, entering one of the holes F, and in which it is kept by the lower edge of the raised or concave end K of the arm H pressing upon its head, as seen in Figs. 1 and 2. The tap is then screwed through the outer shell of the boiler; but before the threads of the tap take hold of the metal of the inner shell or casing the threaded end of the sleeve B will have entered the tap-hole in the outer casing, and the rotation of the tap-stem will cause the said sleeve to be turned down into the threaded hole until the point J of the arm H comes in contact with the outer face of the boiler, when it will be tripped or partially rotated upon its pivotal point sufficiently far to release its upper end, K, from close contact with the pin E, when the spring I, by pressing upon the under side of the pin-head, will lift or raise the said pin E out of the hole F, and permit the free rotation of the tap-stem within the sleeve, which serves to "center" the stem, and prevents abrasion of the threads in the tap-hole of the outer boiler-plate.

Having thus described my invention, what I claim, and desire to secure by Letters Patent, is—

1. In combination with a tap for making stay-bolt holes in steam-boilers and for other like purposes, an adjustable sleeve secured upon the stem of such screw-tap, and provided with a screw-thread of like diameter to that made by the tap, and having an automatic tripping device, whereby the sleeve may be released from positive contact with the tap-stem and permit of the free revolution of said stem within the sleeve, substantially in the manner as herein set forth and specified.

2. The combination, with the tap and tap-stem A, having a series of perforations, F F, of the sleeve B, having a male thread, C, and a pivoted lever-arm, H, movable pin or bolt E, and spring I, constructed, arranged, and operating substantially in the manner and for the purpose herein set forth and specified.

3. A tap provided with a thread-cutting portion, a blank portion, and a guiding portion, substantially as herein described.

4. In combination with a tap for making stay-bolt holes in steam-boilers and for other like purposes, a sleeve secured upon the stem of such screw-tap, and provided with a screw-thread of like diameter to that made by the tap, substantially as and for the purpose herein described.

In witness whereof I have hereunto set my hand.

JOSEPH C. STEBER.

Witnesses:
S. A. OWEN,
RICHD. B. NOYES.